3,222,391
PROCESS FOR RECOVERING KETAL-ESTERS OF
BENZOPHENONE DICARBOXYLIC ACID
James E. Horan, Chicago, Ill., assignor to Standard Oil
Company, Chicago, Ill., a corporation of Indiana
No Drawing. Filed Dec. 28, 1961, Ser. No. 162,960
2 Claims. (Cl. 260—473)

This invention relates to a novel process for preparing ketal-esters of benzophenone dicarboxylic acid and more particularly to a novel process for preparing ketal-esters of 4,4'-benzophenone dicarboxylic acid directly from the acid.

Ketal-esters of 4,4'-benzophenone dicarboxylic acid have been prepared from the keto-esters of 4,4'-benzophenone dicarboxylic acid and found to be useful for plasticizing vinyl chloride resins as more fully disclosed in copending application SN 155,833, filed November 29, 1961. Subsequently, it was discovered that, unlike other benzophenone polycarboxylic acids which do not yield ketal-esters, the 4,4'-benzophenone dicarboxylic acid could be converted directly to the ketal-ester.

The novel process by which the 4,4'-benzophenone dicarboxylic acid can be converted directly to the ketal-ester comprises reacting a 4,4'-benzophenone dicarboxylic acid in a liquid phase with an organic sulfite in the presence of an acid catalyst at a temperature of from about 25° C. to about 200° C. Usually, a suitable solvent is also present.

The reactive mixture from this process generally contains both the ketal-ester and the keto-ester of 4,4'-benzophenone dicarboxylic acid. The ketal-ester can be recovered from this mixture by conventional methods, although the separation of the ketal-ester from the keto-ester by the conventional method (i.e. distillation) is very difficult since the boiling points of the ketal-esters and keto-esters of 4,4'-benzophenone dicarboxylic acid are both very high and similar (both above 200° C. at 1 mm. Hg with about a 30–40° C. difference). Use of elaborate distillation apparatus is necessary.

However, it has been discovered that the ketal-ester can be recovered from the mixture by treating the mixture with an alkane to precipitate the keto-ester. This novel process of treating the mixture with the alkane is an important aspect of this invention. Prior to the treatment, any solvent, unreacted organic sulfite and acid catalyst are first removed from the mixture by conventional methods. The separated mixture is then dissolved in the alkane and the resulting solution is cooled to precipitate out the keto-ester. The ketal-ester can then be recovered from the remaining solution by conventional methods.

Organic sulfites which can be employed in the novel process of preparing the ketal-ester of 4,4'-benzophenone dicarboxylic acid have the formula $(RO)_2SO$ where R is an alkyl, cycloalkyl or aralkyl radical having not more than 12 carbon atoms with the alkyl radical being preferred. It is understood that both R's need not be the same, and that R can contain other elements in addition to carbon and hydrogen, such as oxygen, nitrogen and the halogens. Examples of R radicals are methyl, butyl, isooctyl, dodecyl, cyclopropyl, cyclohexyl and benzyl radicals, and these radicals with ether, nitro, and halogen groups.

The organic sulfite may either be purchased or prepared by methods known in this art. A preferred method is the preparation of the organic sulfite in situ by combining an alcohol and thionyl chloride. An especially desirable alcohol is an alkanol having from 1 to about 12 carbon atoms and having the same R group as that desired in the ketal-ester. In the combination of the alcohol and the thionyl chloride, hydrogen chloride is also produced and serves as an acid catalyst for the reaction.

The organic sulfite is present in a molar ratio of from about 2 to about 10 moles of the sulfite to one mole of the 4,4'-benzophenone dicarboxylic acid and preferably from about 6 to about 8 moles of the sulfite to one mole of the dicarboxylic acid.

Generally, the organic sulfite is contained in an alcohol solution when added to the other reactants. It is preferred that the alcohol has fewer or the same number of carbon atoms as compared to the number in each R group of the organic sulfite. If the alcohol contains more carbon atoms, the alcohol radical may be incorporated into the ketal-ester in place of the R groups of the sulfite.

The acid catalyst generally is a mineral acid such as hydrochloric acid (dry) or sulfuric acid (dry), or an organic substituted mineral acid such as p-toluene sulfonic acid. Only small amounts of the catalyst are required in the reactive mixture although greater amounts may be used such as about 10% or more of the weight of the 4,4'-benzophenone dicarboxylic acid. Commonly, the amount is about 1.0–2.0%.

Generally, a solvent is also present in the reactive mixture having been initially used to dissolve the 4,4'-benzophenone dicarboxylic acid or one of the other reactants. Suitable solvents are, for example, dimethyl formamide, dimethyl sulfoxide, or toluene.

The reaction can be carried out at a temperature as low as 0° C. although generally the temperature range is from about 25° C. to about 200° C. with the preferred range being from about 100° C. to about 180° C. It has been found especially desirable to operate at a temperature of a boiling solution (about 150° C.) when using di-n-butyl sulfite, hydrogen chloride and dimethyl formamide as the organic sulfite, acid catalyst and solvent, respectively, with 4,4'-benzophenone dicarboxylic acid.

The reaction time varies depending on the temperature at which the reaction is carried out and on the degree of completion desired. Reaction times of from about 10 hours to about 30 hours have been common.

The result of this reaction is a mixture which contains both the ketal-ester and the keto-ester of 4,4'-benzophenone dicarboxylic acid in addition to the solvent, remaining unreacted organic sulfite and the acid catalyst. The latter three materials can be separated from the mixture by conventional methods such as by washing the mixture with water and other suitable solvents followed by distilling off any of the three materials which remain.

The ketal-ester can be recovered from the separated mixture by conventional methods such as by distillation under vacuum using an unpacked column having a length of six feet or more. Both the ketal-ester and keto-ester boil above 200° C. at 1 mm. Hg with about a 30–40° C. difference in boiling points. However, a preferred method of recovering the ketal-ester from the keto-ester is by dissolving the separated mixture in an alkane to form a solution and cooling the solution to a temperature at least below about 0° C. to precipitate the keto-ester from the solution. The solution is then separated from the precipitate and consists essentially of the ketal-ester and the alkane. The ketal-ester can then be recovered from the solution by conventional methods such as by evaporating off the alkane. The desired ketal-ester remains.

The alkane used to dissolve the mixture has from about 5 to about 10 carbon atoms and preferably from about 5 to about 7 carbon atoms. Examples of the alkane are n-pentane, isohexane, octane, isooctane and n-decane. The alkane is present in the solution in a volumetric ratio of from about 5 to about 40 volumes and preferably from about 10 to about 20 volumes of alkane to one volume of separated ketal-ester mixture.

When the solution is cooled, the keto-ester precipitate is first observed at a temperature of about 0° C. Further cooling produces a more rapid precipitation. Temperatures of about −30° C. and about −50° C. have been employed for mixtures of 1,1-di-(4-n-butyl-benzene-carboxylate)-1,1-di-n-butoxy methane as the ketal-ester and di-n-butyl 4,4'-benzophenone dicarboxylate as the keto-ester in n-hexane with good results. However, care should be taken to keep the cooling temperature above the solidification temperature of the solution. In the case of n-decane, this temperature limit would be about −29° C.

The solution is cooled at the desired temperature for a time sufficient to remove the keto-ester from the ketal-ester mixture. This time varies depending on the cooling temperature and the degree of removal desired with a time of about 15 minutes being common for temperatures of −30° C. and below when n-hexane is the alkane. The ketal-ester solution is then separated from the precipitate by filtration or any of the other conventional methods.

The remaining solution consists essentially of the ketal-ester and the alkane. Recovery of the ketal-ester can be accomplished by conventional methods such as by evaporating off the alkane. The remaining material consists essentially of the ketal-ester.

The following examples illustrate novel processes for the preparation of a ketal-ester of 4,4'-benzophenone dicarboxylic acid.

EXAMPLE I

Preparation 1,1-di-(4-n-butyl-benzene carboxylate)-1,1-di-n-butoxy methane was prepared directly from 4,4'-benzophenone dicarboxylic acid to illustrate one embodiment of this invention. 230 gm. of thionyl chloride was dissolved in 1.6 liters of toluene in a 3 liter, 3 neck round bottom flask fitted with a stirrer and reflux condenser attached to a sulfuric acid gas drying trap. 130 gm. of pulverized 4,4'-benzophenone dicarboxylic acid was added to the contents of the flask and the mixture was brought to a gentle reflux with stirring. 230 gm. of n-butyl alcohol was then added and the resulting mixture in the flask was stirred with refluxing for approximately 18 hours.

The toluene solution was clear at the end of this time and it was extracted with 500 ml. of 10% (by weight) aqueous $Na_2CO_3$ followed by water extraction (500 ml.). The toluene was distilled off and the crude reaction product was distilled at reduced pressure. Material boiling at 230–360° C. at 1 mm. Hg was collected as product and weighed 130 gm.

Separation

The product (130 gm.) of the above preparation was dissolved in 1000 ml. of n-hexane and the solution chilled to −50° C. and filtered. The precipitate was washed with cold n-hexane. Both the precipitate and filtrate were freed of solvent by heating at 90° C. at a pressure of 25 mm. of Hg. Filtrate weighing 86.0 gm. and precipitate weighing 44.0 gm. remained after the heating step.

The filtrate and precipitate were analyzed for saponification number, percent H and percent C, and compared with calculated values for the ketal-ester and keto-ester. The results are listed in Table I below.

TABLE I

|  | Sap. No. | Percent H | Percent C |
| --- | --- | --- | --- |
| Filtrate (determined) | 221 | 8.41 | 72.7 |
| Ketal-ester (calculated) | 219 | 8.59 | 72.6 |
| Precipitate (determined) | 292 | 7.01 | 72.4 |
| Keto-ester (calculated) | 293 | 6.80 | 72.3 |

Further analysis by infrared absorption spectra showed a broad ether band for the filtrate (ketal-ester) at 9.60 microns; this band was entirely absent in the precipitate (keto-ester). Similarly a sharp keto-carbonyl band at 6.05 microns was observed in the precipitate (keto-ester) and was entirely absent in the filtrate (ketal-ester). Additional dissolving and precipitation of the ketal-ester and keto-ester separately did not yield any additional separation.

EXAMPLE II 1,1-di-(4-n-butyl-benzene carboxylate)-1,1-di-n-butoxy methane was also prepared using the 4,4'-benzophenone dicarboxylic acid, di-n-butyl sulfite, and an acid catalyst. Four runs were made. Table II lists the conditions which varied for the different runs.

TABLE II

| Run No. | 4,4'-Acid (Moles) | Sulfite (Moles) | Molar Ratio of Sulfite to Acid | Catalyst | Yield, percent |
| --- | --- | --- | --- | --- | --- |
| 1 | 0.58 | 1.40 | 2.4 | HCl (dry) | 38 |
| 2 | 0.48 | 1.92 | 4.0 | HCl (dry) | 45 |
| 3 | 0.035 | 0.35 | 10.0 | p-Toluene sulfonic acid | 68 |
| 4 | 0.05 | 0.38 | 7.6 | p-Toluene sulfonic acid | 72 |

In each run, 10 parts by weight of the 4,4'-benzophenone dicarboxylic acid was dissolved in 100 parts by weight of boiling dimethyl formamide containing about 0.1 part by weight of the acid catalyst. To this boilng soluton was added a 50% (by weight) solution of di-n-butyl sulfite in n-butyl alcohol. The resultant solution was refluxed for about 15 hours. At the end of this time, it was poured rapidly into a well stirred mixture of 5 volumes of hexane, one volume of dimethyl formamide and one volume of 5% (by weight) aqueous NaOH. The organic layer was separated, washed twice with an equal volume of water and the hexane removed by evaporation.

Separation of the product was then carried out using the same techniques described for the separation process in Example I except that the temperature was −30° C. Analysis of the ketal-ester filtrate for each run by infrared spectra showed the ether band at 9.60 microns and showed no keto-carbonyl at 6.05 microns.

The yields of the ketal-ester filtrate for each run are shown in Table II. The values demonstrate that better yields result from a sulfite to acid ratio of 7.6 than from ratios of 2.4, 4.0, or 10.0.

By contrast, the same process as described above in Example II was carried out using 2,4'-benzophenone dicarboxylic acid and 3,3'-4,4'-benzophenone tetracarboxylic acid separately in place of the 4,4'-benzophenone dicarboxylic acid. *No detectable amounts* of the n-butyl ketal-ester were produced in either case. The acid was converted only to the n-butyl keto-ester. Again, infrared spectra at 9.60 and 6.05 microns was used for the detection of the presence or absence of the ether and keto-carbonyl bands.

EXAMPLE III

Three mixtures of the above described n-butyl ketal-ester and n-butyl keto-ester of 4,4'-benzophenone dicarboxylic acid were prepared and separated to further illustrate embodiments of this invention. These mixtures in Table III were separated using the same separation technique described in Example I, except that the cooling temperature for the ketal-ester product and n-hexane solution was −30° C.

TABLE III

| Run No. | Mixture Wt. (gm.) | Hexane Vol. (liters) | Precipitate (Keto-ester) | | Filtrate (Ketal-ester) | |
|---|---|---|---|---|---|---|
| | | | (gm.) | wt. percent | (gm.) | wt. percent |
| 1 | 216 | 2.0 | 107 | 49.6 | 108.5 | 50.4 |
| 2 | 24.8 | 0.300 | 5.8 | 23.4 | 19.0 | 76.6 |
| 3 | 11.4 | 0.125 | 8.9 | 78.1 | 2.5 | 21.9 |

The results in Table III demonstrate that the keto-ester was removed quantitively from the ketal-ester for each run and that the separation was operable on mixtures having from 23.4% to 78.1% (by weight) of the keto-ester.

The quantitative separation in each case was determined by infrared absorption spectra which showed the ether band (9.60 microns) but no keto-carbonyl band (6.05 microns) for the filtrate (ketal-ester) and the reverse for the precipitate (keto-ester).

Thus having described the invention, what is claimed is:

1. A novel process for recovering a ketal-ester of 4,4′-benzophenone dicarboxylic acid from a mixture of said ketal-ester and a keto-ester of 4,4′-benzophenone dicarboxylic acid, which process comprises, dissolving said mixture in an alkane to form a solution, said alkane having from about 5 to about 10 carbon atoms and being present in a volumetric ratio of from about 5 to about 40 volumes of said alkane to one volume of said mixture, cooling said solution to a temperature at least below about 0° C. for a time sufficient to precipitate said keto-ester from said solution, separating said solution from said precipitate, and recovering said ketal-ester from said solution.

2. The process of claim 1 wherein said ketal-ester is 1,1-di-(4-n-butyl-benzene carboxylate)-1,1-di - n - butoxy methane, said keto-ester is di-n-butyl 4,4′-benzophenone dicarboxylate, and said alkane is n-hexane.

References Cited by the Examiner
OTHER REFERENCES

Iselin et al.: Helv. Chim. Acta. Volume 40, 373–87 (1957).

Wagner et al.: Synthetic Organic Chemistry (New York, 1953), pages 261–4.

Weissberger: Technique of Organic Chemistry, Volume III, Part I "Separation and Purification" (New York, 1956), pages 485–94.

LORRAINE A. WEINBERGER, *Primary Examiner.*

DURAL McCUTCHEN, LEON ZITVER, *Examiners.*

UNITED STATES PATENT OFFICE
CERTIFICATE OF CORRECTION

Patent No. 3,222,391　　　　　　　　　　　　　　　December 7, 1965

James E. Horan

It is hereby certified that error appears in the above numbered patent requiring correction and that the said Letters Patent should read as corrected below.

Column 3, line 61, for "230-360° C." read -- 230-260° C. --.

Signed and sealed this 27th day of September 1966.

(SEAL)
Attest:

ERNEST W. SWIDER　　　　　　　　　　　　　　EDWARD J. BRENNER
Attesting Officer　　　　　　　　　　　　　　　Commissioner of Patents